(12) United States Patent
Arce

(10) Patent No.: US 11,808,332 B2
(45) Date of Patent: Nov. 7, 2023

(54) SELF-BINDING NON-JAMMING STOP MODULE FOR ROTARY DRIVE ACTUATOR

(71) Applicant: MOOG INC., Elma, NY (US)

(72) Inventor: Arturo M. Arce, Huntington Beach, CA (US)

(73) Assignee: Moog Inc., Elma, NY (US)

( * ) Notice: Subject to any disclaimer, the term of this patent is extended or adjusted under 35 U.S.C. 154(b) by 342 days.

(21) Appl. No.: 17/423,384

(22) PCT Filed: Feb. 24, 2020

(86) PCT No.: PCT/US2020/019407
§ 371 (c)(1),
(2) Date: Jul. 15, 2021

(87) PCT Pub. No.: WO2020/176375
PCT Pub. Date: Sep. 3, 2020

(65) Prior Publication Data
US 2022/0128137 A1    Apr. 28, 2022

Related U.S. Application Data

(60) Provisional application No. 62/810,130, filed on Feb. 25, 2019.

(51) Int. Cl.
| F16D 55/02 | (2006.01) |
| F16D 59/00 | (2006.01) |
| F16D 121/14 | (2012.01) |
| F16D 125/40 | (2012.01) |
| F16D 125/50 | (2012.01) |
| F16H 35/00 | (2006.01) |
| B64C 13/34 | (2006.01) |

(52) U.S. Cl.
CPC ............. *F16H 35/00* (2013.01); *B64C 13/34* (2013.01); *F16D 55/02* (2013.01); *F16D 59/00* (2013.01); *F16D 2121/14* (2013.01); *F16D 2125/40* (2013.01); *F16D 2125/50* (2013.01); *F16H 2035/006* (2013.01)

(58) Field of Classification Search
CPC ................ F16H 1/46; F16H 2035/005; F16H 2035/006; F16H 25/2021; F16H 25/2018; F16D 55/02; F16D 59/00; F16D 2121/14; F16D 2125/40; F16D 2125/50
See application file for complete search history.

(56) References Cited

U.S. PATENT DOCUMENTS

| 3,203,275 A | 8/1965 | Hoover |
| 3,342,290 A * | 9/1967 | Klaue .................... F16D 55/06 |
| | | 192/85.26 |
| 4,641,737 A | 2/1987 | Gillingham et al. |
| 4,930,730 A | 6/1990 | Quick |
| 9,016,152 B2 * | 4/2015 | Jones .................. F16H 25/2454 |
| | | 74/89.35 |
| 10,066,735 B1 * | 9/2018 | Martin .................... F16H 57/12 |
| 2005/0049107 A1 | 3/2005 | Willmot et al. |

(Continued)

*Primary Examiner* — Huan Le
*Assistant Examiner* — Aimee Tran Nguyen
(74) *Attorney, Agent, or Firm* — Hodgson Russ LLP

(57) ABSTRACT

A rotary actuator has a stop module configured to mechanically link two gear stages travelling at different rotational speeds when an end-of-stroke travel limit is reached, thereby causing the rotary actuator to bind because relative motion between the gear stages is impeded.

11 Claims, 5 Drawing Sheets

(56) References Cited

U.S. PATENT DOCUMENTS

2013/0048443 A1* 2/2013 Muramatsu ............. F16D 65/18
                                                188/72.1
2013/0161148 A1  6/2013 Schoon et al.
2015/0167761 A1* 6/2015 Son ................... F16D 65/18
                                                188/72.6

* cited by examiner

SELF-BINDING NON-JAMMING STOP MODULE FOR ROTARY DRIVE ACTUATOR

FIELD OF THE DISCLOSURE

The present disclosure relates to a travel-limiting stop module for providing a mechanical stop at either end or both ends of a predefined stroke of a rotary drive actuator. For example, the present disclosure may be applied, but is not limited, to geared rotary actuators (GRAs) used in actuation systems for aircraft control surfaces.

BACKGROUND OF THE DISCLOSURE

End-of-stroke stopping mechanisms, also referred to as stop modules, dissipate excess rotational kinetic energy of a rotational drive system to stop rotation when a travel limit in a given direction of travel is reached. In some applications, the excess rotational kinetic energy may be significant, and it must be dissipated very quickly. For example, a GRA in an actuation system for displacing an aircraft flight control surface may be driven by a hydraulic motor at very high revolutions per minute, and rotation must be safely stopped within a very short time span. It is desirable to provide a stopping mechanism which resists jamming when a hard stop is reached at a travel limit position, and is resettable by reverse rotation of an input drive shaft. Furthermore, it is advantageous to minimize the weight and size of the stopping mechanism, especially for aircraft applications.

In a GRA having a multistage planetary gear system, one set of gears will travel at a different rotational speed than another set of gears. The inventor has realized that the difference in rotational speeds may be exploited to provide a non-jamming stopping mechanism which is mechanically simple, lightweight, and small, and which resets on reverse rotation.

SUMMARY OF THE DISCLOSURE

A rotary actuator has a stop module configured to mechanically link two gear stages travelling at different rotational speeds when an end-of-stroke travel limit is reached, thereby causing the rotary actuator to bind because relative motion between the gear stages is impeded. The rotary actuator may comprise an input shaft rotatably driven by an input torque, a first gear stage having a first stage carrier driven to rotate by rotation of the input shaft, and a second gear stage having a second stage carrier driven to rotate by rotation of the first stage carrier. The first stage carrier may include a threaded portion, and the second stage carrier may include gear teeth.

The stop module may include a first spur gear nut and a second spur gear nut threadably mated with the threaded portion of the first stage carrier, a brake plate arranged for travel with the first and second nuts along an axis of the threaded portion of the first stage carrier, and first and second brake disks coupled to the input shaft to define opposite end-of-stroke travel limits. A transmission assembly may be configured to transmit rotational motion of the second stage carrier to the first and second nuts to cause the first and second nuts to travel axially along the axis of the threaded portion of the first stage carrier, wherein the brake plate is caused to engage the first brake disk at a first end-of-stroke travel limit of the rotary actuator to stop rotation of the input shaft in a first rotational direction, and the brake plate is caused to engage the second brake disk at a second end-of-stroke travel limit of the rotary actuator to stop rotation of the input shaft in a second rotational direction.

BRIEF DESCRIPTION OF THE DRAWINGS

The nature and mode of operation of the present invention will now be more fully described in the following detailed description taken with the accompanying drawing figures, in which.

DETAILED DESCRIPTION OF THE DISCLOSURE

Figure 1:
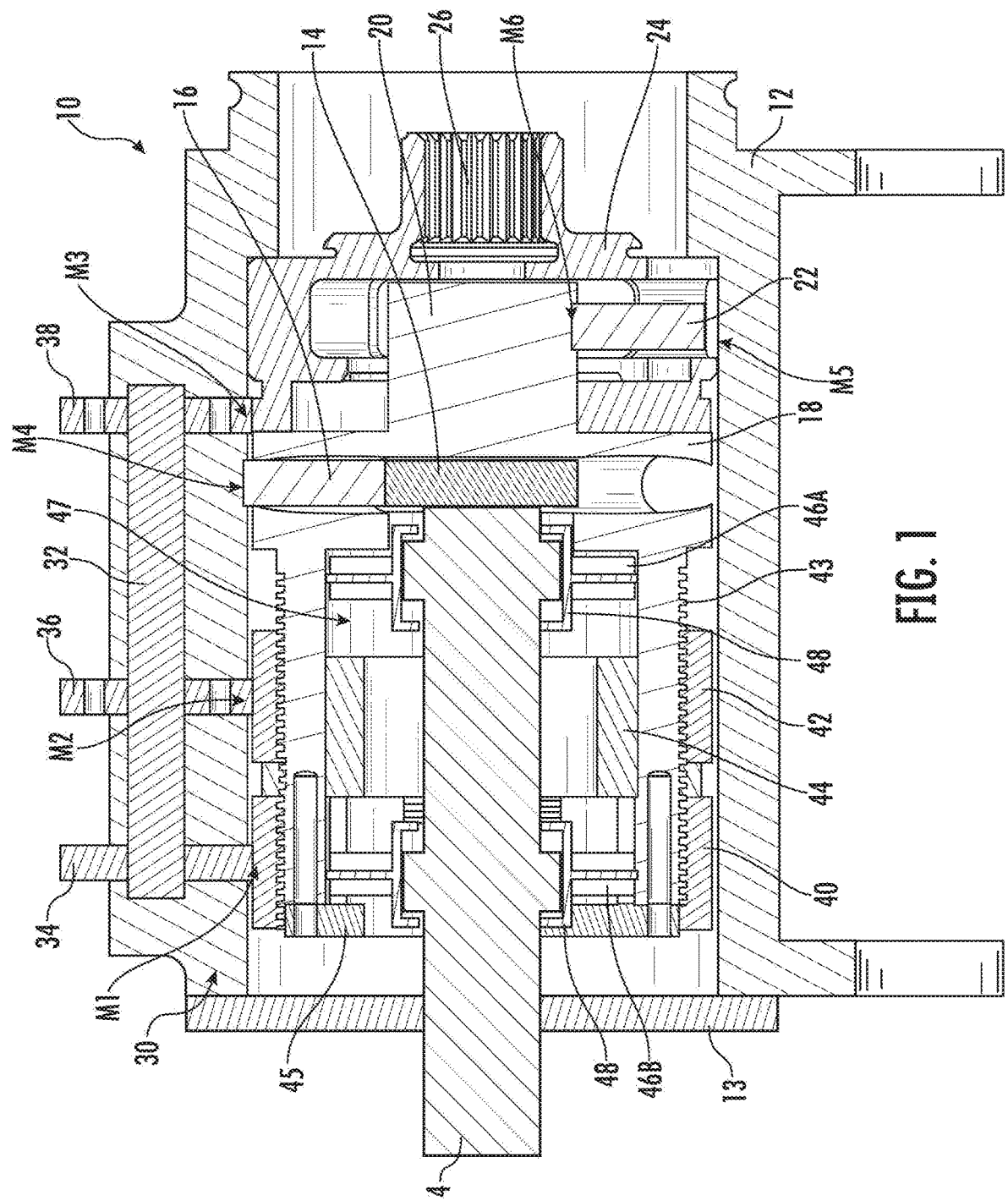
FIG. 1 is a cross-sectional view of GRA configured with a stop module of the present disclosure, wherein the GRA is coupled to an input drive shaft.
Figure 2:
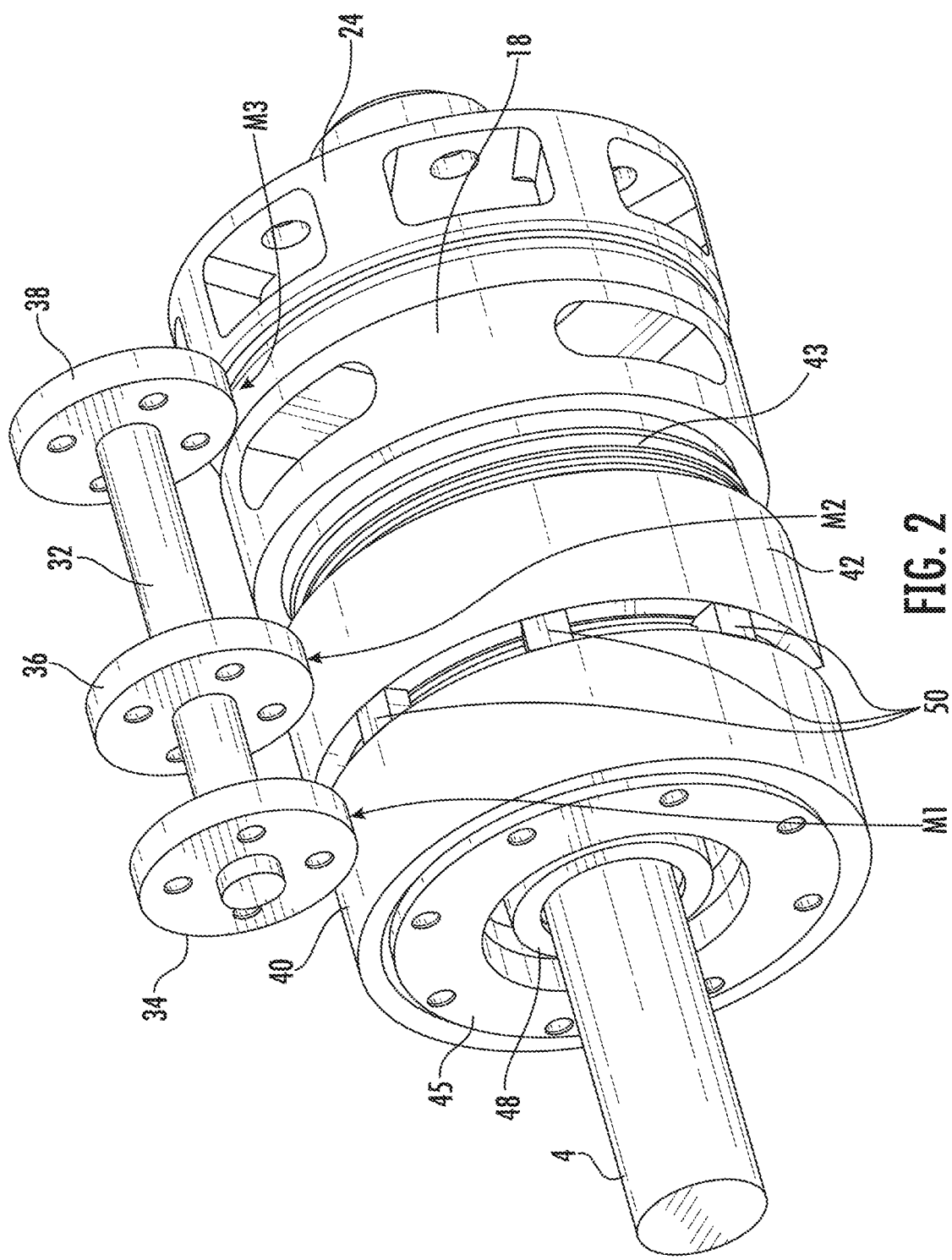
FIG. 2 is perspective view of the GRA and input drive shaft of FIG. 1, wherein the GRA is shown without its housing for sake of clarity.
Figure 3:
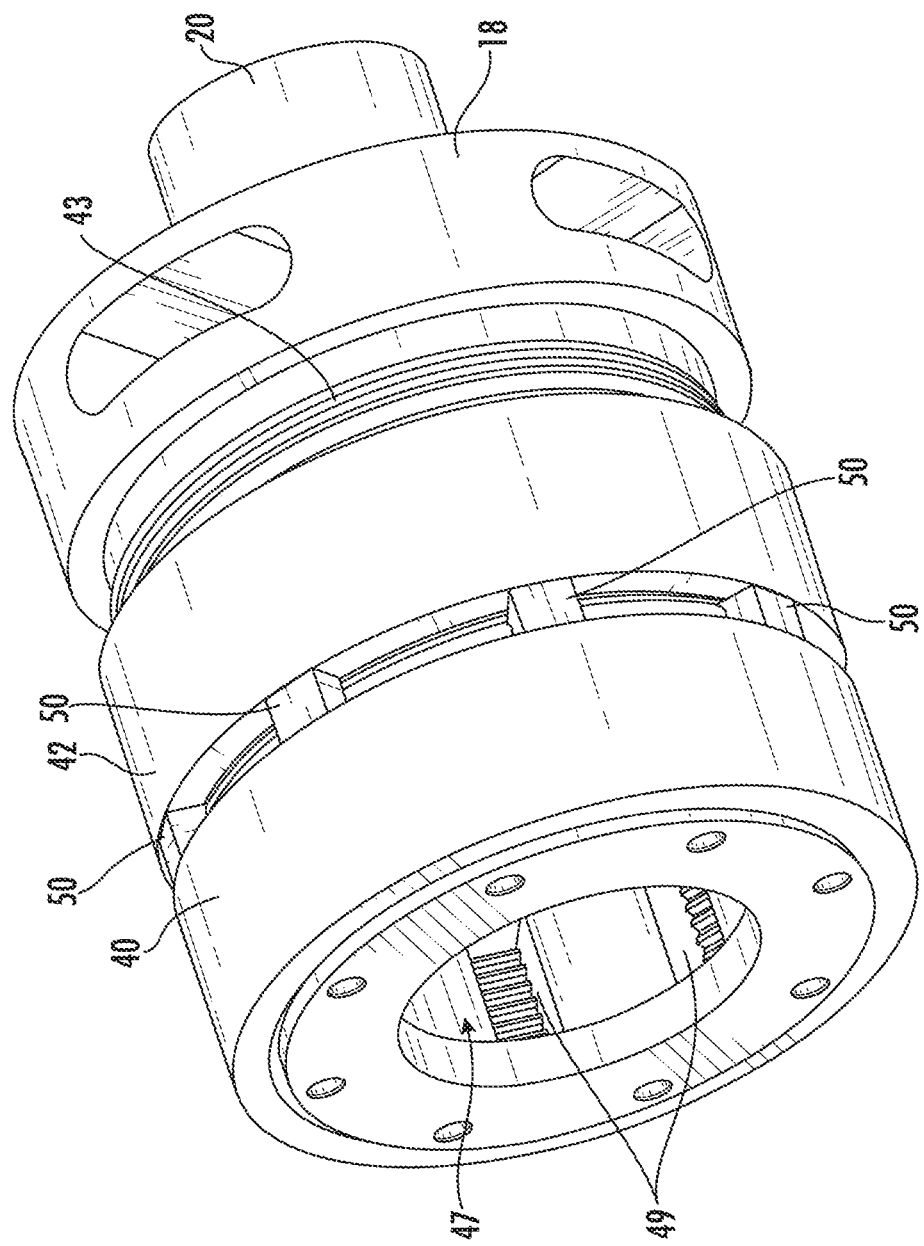
FIG. 3 is a perspective view showing a subassembly of the GRA including a pair of spur gear nuts engaging with a translating brake plate and a first stage carrier.
Figure 5:
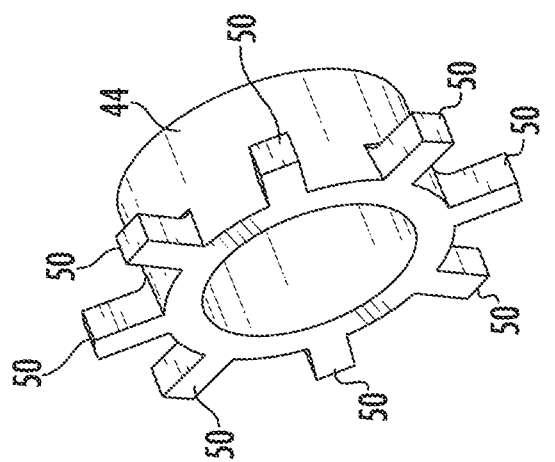
FIG. 5 is a perspective view of the translating brake plate in isolation.
Figure 4:
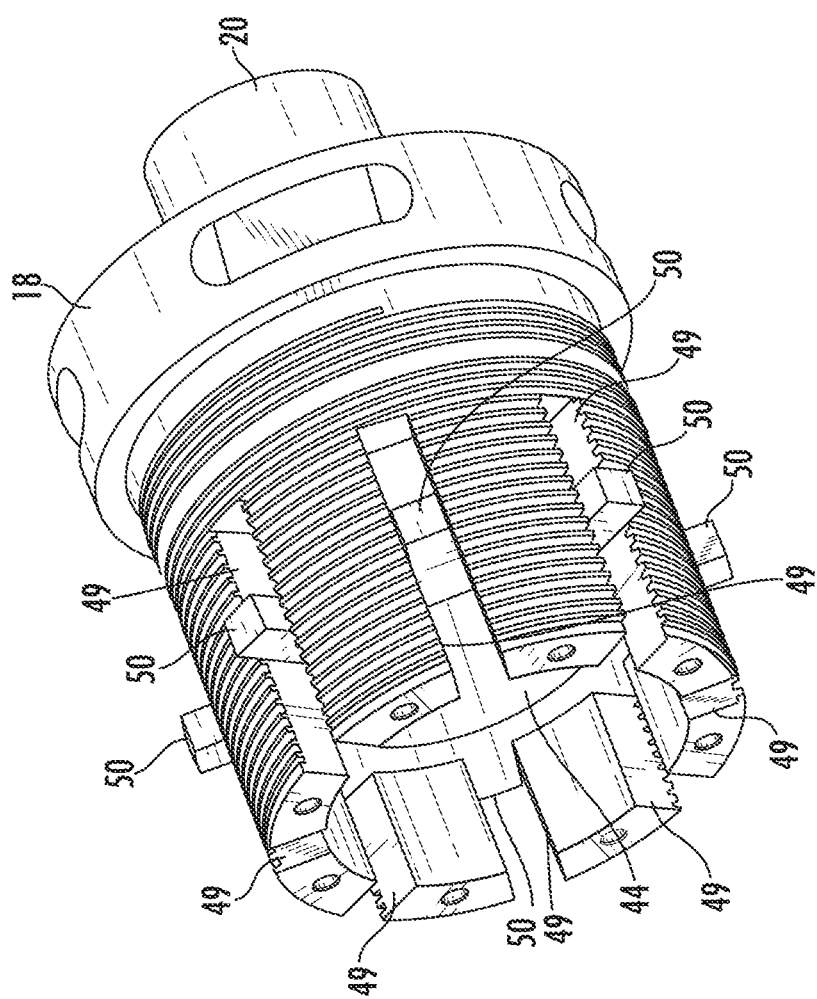
FIG. 4 is a perspective view of the translating brake plate mating with the first stage carrier.
Figure 6:
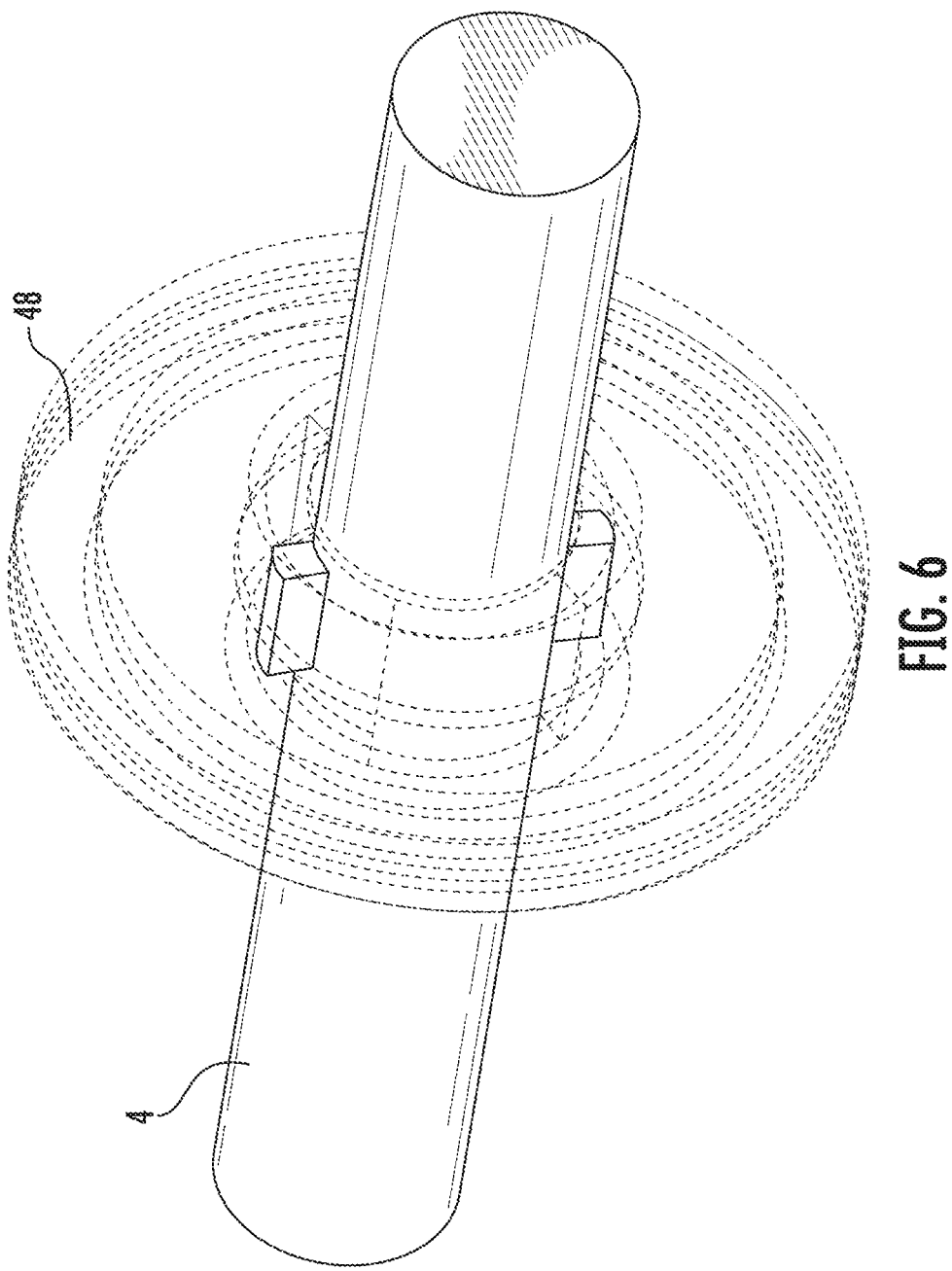
FIG. 6 is a perspective view, partially transparent, showing an anti-jamming coupling of the stop module mated with the input drive shaft.

FIG. 1 shows a GRA 10 connected to an input shaft 4 driven to rotate by a motor (not shown). The motor may be any type, including a hydraulic motor, an electric motor, a pneumatic motor, or an internal combustion engine. GRA 10 is configured to include a stop module 30 described in detail below.

Referring also now to FIGS. 2-6, GRA 10 may comprise a first planetary gear stage including a sun gear 14 arranged at an end of input shaft 4. Sun gear 14 has external gear teeth and may mesh with a first set of planet gears 16, which in turn may mesh with internal gear teeth fixed in housing 12 such that housing 12 acts as a ring gear for the first planetary gear stage. The first planetary gear stage may further include a first stage carrier 18 coupled to planet gears 16, whereby the first stage carrier 18 is driven to rotate about the axis of input shaft 4 upon rotation of the input shaft. An end portion of first stage carrier 18 may have external gear teeth to act as a sun gear 20 of a second planetary gear stage of GRA 10. The second planetary gear stage may further include a second set of planet gears 22 meshed with sun gear 20 and with internal gear teeth fixed in housing 12 forming a ring gear for the second planetary gear stage. The second planetary gear stage may also include a second stage carrier 24 coupled to planet gears 22, whereby the second stage carrier 24 is driven to rotate about the axis of input shaft 4 upon rotation of input shaft 4 and first stage carrier 18. The first and second gear stages of GRA 10 may be configured such that first stage carrier 18 rotates at a higher speed (i.e. higher rpm) than second stage carrier 24 for a given rotational speed of input shaft 4. Second stage carrier 24 may include an output spline 26 for connection to a load (not shown). An end cover 13 may be fastened to housing 12. The figures are simplified by omitting detailed depiction of gear teeth.

Stop module 30 may comprise a brake transfer shaft 32 on which a first spur gear 34, a second spur gear 36, and a third spur gear 38 are mounted for rotation with the brake transfer shaft 32. First spur gear 34 may be meshed at M1 with a first spur gear nut 40 having external gear teeth and internal screw threads. Likewise, second spur gear 36 may be meshed at M2 with a second spur gear nut 42 having external gear teeth and internal screw threads, for example acme screw threads. Spur gear nuts 40 and 42 may be threadably mated on a threaded portion 43 of first stage carrier 18 such that relative rotation between spur gear nuts 40 and 42 on the one hand and first stage carrier 18 on the other will cause spur gear nuts 40 and 42 to travel in an axial direction along threaded portion 43 of first stage carrier 18. As will be understood, the direction of travel of spur gear nuts 40 and 42 is dependent upon the direction of rotation of input shaft 4. Threaded portion 43 of first stage carrier 18 may have an externally threaded cylindrical wall surrounding an axial travel passage 47.

A translating brake plate 44 may be captured between spur gear nuts 40 and 42. In the illustrated arrangement, brake plate 44 is received within travel passage 47 of threaded portion 43, and may include a plurality of radial spokes 50 each received within a corresponding axially extending slot 49 through the cylindrical wall of threaded portion 43. A radially outer end of each spoke 50 may extend into a gap between spur gear nuts 40 and 42, whereby axially directed motion of the spur gear nuts 40 and 42 is transmitted to translating brake plate 44 by engagement of the pushing nut with the radially outer ends of spokes 50. As a result, translating brake plate 44 travels axially along threaded portion 43 with spur gear nuts 40 and 42. An end plate 45 may be fastened to an end of threaded portion 43 of first stage carrier 18.

A first brake disk 46A and a second brake disk 46B may be arranged at opposite ends within the cylindrical wall of threaded portion 43. An anti-jamming coupling 48 may be provided for each brake disk 46A, 46B.

In the illustrated embodiment, transfer shaft 32, first spur gear 34, second spur gear 36, and third spur gear 38 provide a transmission assembly configured to transmit rotational motion of second stage carrier 24 to first spur gear nut 40 and second spur gear nut 42 to cause the first and second nuts 40, 42 and brake plate 44 to travel in opposite directions along the axis of threaded portion 43 of the first stage carrier 18. In this context, third gear 38 may be thought of as an input gear of the transmission assembly, while first gear 34 and second gear 36 may be thought of as first and second output gears of the transmission assembly, respectively. The direction of axial travel of brake plate 44 depends upon the rotation direction of input shaft 4. As may be understood, the transmission assembly is subject to modification and may take on a variety of forms.

Operation of stop module 30 may be described as follows. A clockwise input torque/speed is provided to the system via the input shaft 4 rotating sun gear 14 of the first planetary gear stage. Input shaft 4 carries with it the two brake disks 46A, 46B attached through the respective anti-jamming couplings 48. The clockwise rotational output of the first stage planetary gear system is realized by first stage carrier 18, thereby driving sun gear 20 of the second stage planetary gear system. The clockwise output of the second stage planetary gear system is realized by second stage carrier 24. Second stage carrier 24 outputs torque/speed to drive a load or another set of gears, and simultaneously drives third spur gear 38. Third spur gear 38 transfers torque/speed through brake transfer shaft 32 to drive first spur gear 34 and second spur gear 36. First and second spur gears 34, 36 respectively drive first and second spur gear nuts 40, 42. As the first and second spur gear nuts 40, 42 rotate about the mating threaded portion 43 of first stage carrier 18, they translate along the axis of input shaft 4. The linear motion pushes on translating brake plate 44 until translating brake plate 44 squeezes on first brake disk 46A. Squeezing on first brake disk 46A causes input shaft 4 to decelerate until the entire system stops. This is the maximum travel that can be achieved in the clockwise direction. Any further torque provided through input shaft 4 in the clockwise direction will be counteracted by this jamming effect, thus mating the system stationary.

If counter-clockwise rotation of input shaft 4 is then commanded, the anti-jamming coupling 48 allows the input shaft 4 to rotate in the counter-clockwise direction, thereby reversing the series of operations described above and freeing first brake disk 46A. Continuing to provide rotation in the counter-clockwise direction will cause the process to continue in the opposite direction, making translating brake plate 44 move towards second brake disk 46B until it squeezes on second brake disk 46B impeding further motion.

The illustrated embodiment is bidirectional, however a unidirectional embodiment having only one nut for pushing brake plate 44 in one axial direction toward only one brake disk is within the scope of the disclosure.

While the present disclosure describes exemplary embodiments, the detailed description is not intended to limit the scope of the invention to the particular forms set forth. The invention is intended to cover such alternatives, modifications and equivalents of the described embodiments as may be apparent to one of ordinary skill in the art.

What is claimed is:

1. A rotary actuator comprising:
   an input shaft rotatably driven by an input torque;
   a first gear stage having a first stage carrier driven to rotate by rotation of the input shaft, the first stage carrier including a threaded portion;
   a second gear stage having a second stage carrier driven to rotate by rotation of the first stage carrier, wherein the second stage carrier includes gear teeth;
   a first nut threadably mated with the threaded portion of the first stage carrier, wherein the first nut includes gear teeth;
   a brake plate arranged for travel with the first nut along an axis of the threaded portion of the first stage carrier;
   a first brake disk coupled to the input shaft; and
   a transmission assembly configured to transmit rotational motion of the second stage carrier to the first nut to cause the first nut and the brake plate to travel in a first axial direction along the axis of the threaded portion of the first stage carrier;
   wherein the brake plate engages the first brake disk at a first end-of-stroke travel limit of the rotary actuator to stop rotation of the input shaft.

2. The rotary actuator according to claim 1, further comprising:
   a second nut threadably mated with the threaded portion of the first stage carrier, wherein the second nut includes gear teeth;
   a second brake disk coupled to the input shaft;
   wherein the brake plate is arranged for travel with the second nut along the axis of the threaded portion of the first stage carrier;
   wherein the transmission assembly is further configured to transmit rotational motion of the second stage carrier to the second nut to cause the second nut and the brake plate to travel in a second axial direction along the axis of the threaded portion of the first stage carrier opposite to the first axial direction;

wherein the brake plate engages the second brake disk at a second end-of-stroke travel limit of the rotary actuator to stop rotation of the input shaft.

3. The rotary actuator according to claim 2, wherein the brake plate is arranged between the first nut and the second nut.

4. The rotary actuator according to claim 2, wherein the threaded portion of the first stage carrier includes a cylindrical wall surrounding an axial travel passage, the cylindrical wall having a plurality of axially extending slots therethrough, and the brake plate is received within the travel passage and includes a plurality of radial spokes extending through the plurality of slots for engagement with the first nut and the second nut.

5. The rotary actuator according to claim 2, wherein the first nut is a first spur gear nut having gear teeth, the second nut is a second spur gear nut having gear teeth, and the transmission assembly includes a transfer shaft having an input gear meshed with the gear teeth of the second stage carrier, a first output gear meshed with the gear teeth of the first spur gear nut, and a second output gear meshed with the gear teeth of the second spur gear nut.

6. The rotary actuator according to claim 2, further comprising a first anti-jamming coupling for coupling the first brake disk to the input shaft, and a second anti-jamming coupling for coupling the second brake disk to the input shaft.

7. The rotary actuator according to claim 1, wherein the threaded portion of the first stage carrier includes a cylindrical wall surrounding an axial travel passage, the cylindrical wall having a plurality of axially extending slots therethrough, and the brake plate is received within the travel passage and includes a plurality of radial spokes extending through the plurality of slots for engagement with the first nut.

8. The rotary actuator according to claim 1, wherein the first nut is a first spur gear nut having gear teeth, and the transmission assembly includes a transfer shaft having an input gear meshed with the gear teeth of the second stage carrier and a first output gear meshed with the gear teeth of the first spur gear nut.

9. The rotary actuator according to claim 1, further comprising an anti jamming coupling for coupling the first brake disk to the input shaft.

10. The rotary actuator according to claim 1, wherein the first gear stage is a planetary gear stage having a first sun gear coupled to the input shaft for rotation with the input shaft, a first ring gear surrounding the first sun gear, a first set of planetary gears meshed with the first sun gear and the first ring gear, wherein the first stage carrier rotates with the first set of planetary gears about a rotational axis of the input shaft.

11. The rotary actuator according to claim 10, wherein the second gear stage is a planetary gear stage having a second sun gear coupled to the first stage carrier for rotation with the first stage carrier, a second ring gear surrounding the second sun gear, a second set of planetary gears meshed with the second sun gear and the second ring gear, wherein the second stage carrier rotates with the second set of planetary gears about a rotational axis of the input shaft.

* * * * *